INVENTOR.
ELIE CONDOLIOS

April 5, 1966     E. CONDOLIOS     3,244,455
HYDRAULIC PLANTS FOR SURFACING ORES

INVENTOR.
ELIE CONDOLIOS
BY
ATTORNEY

April 5, 1966 E. CONDOLIOS 3,244,455
HYDRAULIC PLANTS FOR SURFACING ORES
Filed Sept. 11, 1962 5 Sheets-Sheet 4

INVENTOR.
ELIE CONDOLIOS
BY
ATTORNEY

Fig. 8.

United States Patent Office 3,244,455
Patented Apr. 5, 1966

3,244,455
HYDRAULIC PLANTS FOR SURFACING ORES
Elie Condolios, Grenoble, France, assignor to Societe Grenobloise d'Etudes et d'Applications Hydrauliques, Grenoble, France, a corporation of France
Filed Sept. 11, 1962, Ser. No. 222,875
Claims priority, application France, Sept. 21, 1961, 4,400
9 Claims. (Cl. 302—14)

This invention relates to a hydraulic transfer plant for conveying mineral material to a raised place for collection thereof, such as the raising of coal from the interior of a mine to the ground surface.

The conditions under which hydraulic plants of the indicated type operate, create problems that have concerned the art ever since this type of plant was first devised. For example, it is necessary that the mineral material which is under substantially atmospheric pressure at the bottom of the mine shaft, be introduced into the transfer pipe in which the liquid is under high pressure, and such introduction should be made at as fast and continuous a rate as possible in order to provide a continuous, constantly moving column of the material in the pipe. Consequently, it is necessary that the mineral material be fed into the transfer pipes by means of pressure locks which raise the pressure on such material before it is introduced into the transfer liquid flowing through the pipe. As the flow of the mineral material through such locks is controlled by valves the latter should be designed to operate satisfactorily with such difficult material and with a minimum of wear on the parts thereof coming into contact with such material. Problems also arise when attempts are made to make the pressure changes more rapid in order to increase the rate of flow of the mineral material to the transfer pipe and because of the usual feed back of the liquid under high pressure in the transfer pipe into the pressure locks. In the latter case, the water flowing back into the pressure locks in a direction opposite to the flow of the material towards the transfer pipe, causes a substantial braking to such flow of the material both into the pressure lock and out of the latter as it proceeds to the transfer pipe. Also when a rapid change from amospheric pressure to the high liquid pressure is attempted in the pressure lock, the chamber of the latter is expanded, while the liquid therein is compressed, thus creating a serious water hammer.

It is the primary purpose of the present invention to provide an improved hydraulic transfer plant of the indicated type that will be free of the aforesaid disadvantages.

In accordance with the invention, there is provided in the feeding apparatus for the mineral material, valve mechanisms each comprising a valve member and seat of such improved construction that they are enabled to operate readily with a minimum of abrasive wear from the mineral material. This is accomplished by providing the valve member with a gasket construction of such nature that the valve seat is cleaned as the valve closes and a tight seal is attained without a metal to metal contact. Also the valve seat is constructed in the shape of a cone, the base angle of which is sufficiently large, from between 45°–60°, to prevent grains of the mineral material from depositing on the seat and to achieve perfect centering of the valve on the seat. The valve mechanism further includes a hydraulic jack for operating the valve member and which is so suspended within an associated chamber as to enable such jack to automatically move to a position that will assure perfect centering of the valve member on its cone-shaped seat. The hydraulic jack is wholly positioned as a complete unit within its associated chamber and is connected to the exterior of such chamber solely by two pipes for supplying the hydraulic liquid pressure necessary to operate the same, thereby effecting a simple, efficient structure. Means are also provided to protect the rod of the jack against abrasion by the material passing through the chamber.

In accordance with another feature of the invention, the pressure compensating fluid circuit associated with a pressure lock is provided with means having a high load loss such as a nozzle of small diameter, a cyclone, or any other similar apparatus, arranged to brake the flow of high pressure liquid to the chamber of the pressure lock to the extent that water hammer is prevented when the pressure in such chamber is raised.

The invention also provides means operative to remove from a pressure lock the same apparent volume of water as the volume of material received into the pressure lock as it is being filled, and to introduce into such pressure lock a volume of water sufficient to replace the material discharged from the lock. As a result of such means, the opposing flow of water usually present in known installations can be replaced by pressure conditions which enable a gravity feed of the material. By a suitable control of such means, it is possible by creating a flow of water through the intake and discharge ports of the pressure lock in the same direction as the flow of the material, to increase hydraulically the rate of flow of the mineral material into and out of the pressure lock.

Other features of the hydraulic transfer plant of this invention, as well as the advantages thereof, will become apparent from a perusal of the following description of several types of design suitable for a coal surfacing plant, when considered in connection with the accompanying drawings, in which.

Figure 1:
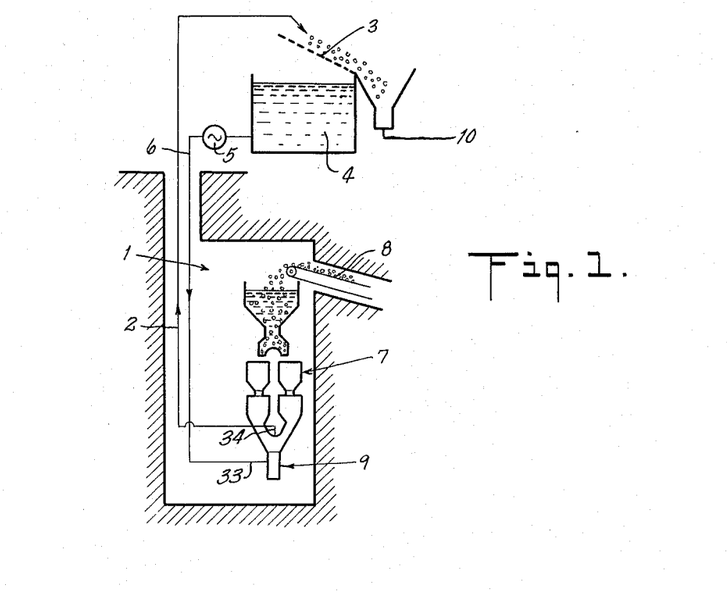
FIG. 1 is a schematic elevational view of a coal surfacing plant with a closed liquid circuit shown positioned in a mine shaft indicated in vertical section, and provided with the features of this invention.

In the construction shown in FIG. 1 of the drawings, the reference numeral 1 indicates the shaft of a coal mine in which is located a closed circuit hydraulic surfacing plant of the general type described in French Patent No. 1,210,036, issued to the assignee of this application. As is disclosed in such French patent, in such a plant, the lift pump 5 for circulating the material conveying water and the associated recovery tank 4 are situated on the surface of the ground at the place of delivery of the coal. The water is removed from the tank 4 by the pump 5 and delivered into a vertically disposed pipe 6 for conducting the same to the part 9 of the plant at which the coal will be fed into the hydraulic system by a double pressure lock coal introducing system which is indicated generally by the reference numeral 7. Coal is delivered from the mine to the pressure lock system 7 in any suitable manner, as by a conveyor 8.

The coal laden water is forced through a vertically disposed surfacing conduit 2 to a separating device 3 which is in the nature of a sieve and is arranged to discharge the separated carrying water into the recovery tank 4. The coal extracted from the water by sieve 3 is collected in a bin 10 from which it is taken to a place of storage.

Figure 2:
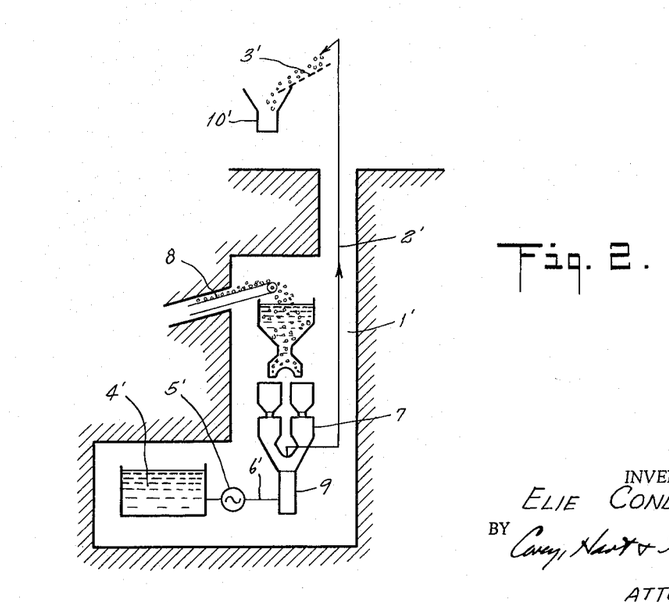
FIG. 2 is a similar view of a coal surfacing plant having an open liquid circuit and constructed in accordance with the invention.

In an open circuit type of installation such as shown in FIG. 2 of the drawings, the delivery pump 5′ is located at the bottom of the mine shaft 1′ and draws water from a sump 4′ which is also located at the bottom of the mine and receives water pumped from the mine. The pump 5′ delivers the water to the part 9 of the plant where, as in the system shown in FIG. 1, the coal fed to the plant by the conveyor 8 is introduced by the double pressure lock system 7 of such plant into the conveying water which then carries the coal up through the surfacing pipe 2′ to a sieve 3′ for recovering the coal and discharging it into a collecting device 10′.

It is to be noted that in each of the plants shown in FIGS. 1 and 2, the essential component thereof is the double pressure lock system 7 for charging the coal into the hydraulic circuit because of the fact that the coal which is under substantially atmospheric pressure at the bottom of the mine, must be introduced in a substantially continuous manner into water flowing in the hydraulic circuit under a pressure of some dozens of kg./cm.$^2$. This double pressure lock system, as is shown more clearly in FIG. 3 of the drawings, comprises in effect, two identical pressure lock systems designated I and II and coordinated so that as the pressure lock of one of such systems (say system I) is recharged for delivery of coal into the hydraulic circuit, the other system (system II) discharges coal under pressure into the conveying water flowing through such circuit at the plant part 9, thereby assuring a practically continuous feed of the coal into the hydraulic circuit.

Figure 3:
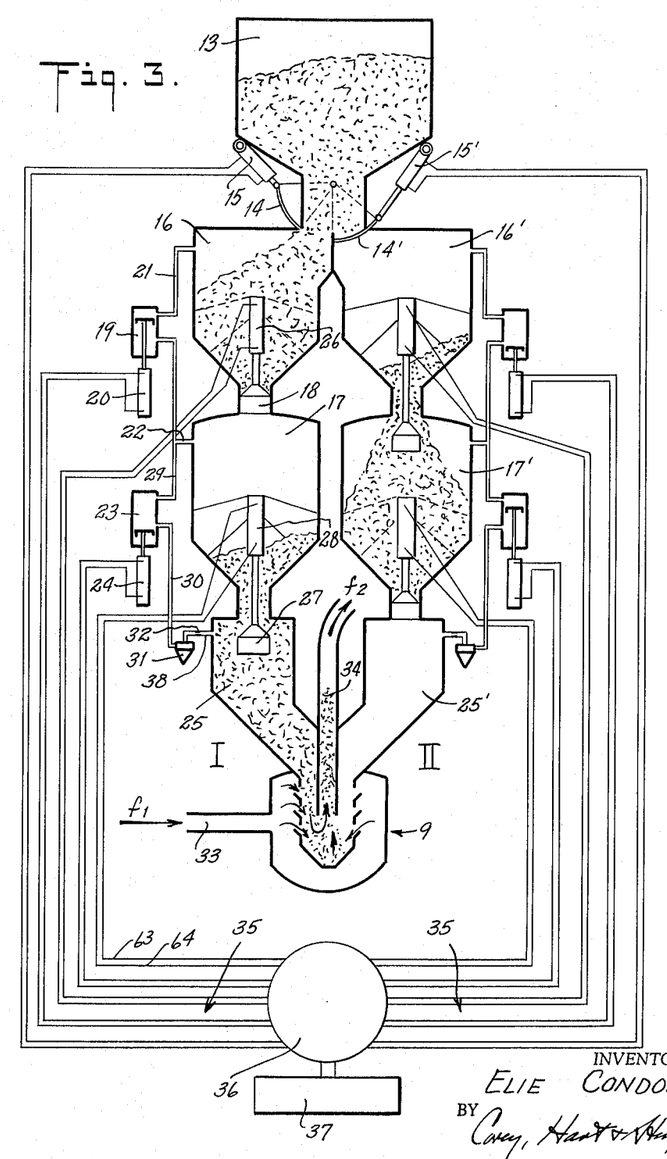
FIG. 3 is an enlarged schematic view showing in vertical elevation an arrangement of apparatus in accordance with the invention for charging the coal material into the liquid circuit of a coal surfacing plant.

The coal from the mine is discharged by the conveyor 8 into a common hopper 13 for the supply of both lock systems I and II, the gravity feed thereto from the hopper being controlled by the bottom hopper closures 14, 14′ which are alternately actuated by their associated hydraulic jacks 15, 15′, respectively. In FIG. 3 of drawings the closure 14 is shown opened and closure 14′ closed. Coal will therefore feed by gravity from the supply hopper 13 into the loading hopper 16 for the pressure lock 17. It will be noted that as this operation takes place, the bottom valve 18 of the loading hopper 16 is closed to enable such hopper to retain the coal being fed thereto, and the bottom valve 27 of the pressure lock 17 is opened to enable the coal which has been loaded into such pressure lock in the previous cycle to be discharged simultaneously into a feed pipe 25. It will be noted also that a pressure compensating valve 19 controlled by a hydraulic jack 20, and connected to hopper 16 by a pipe 21 and to the pressure lock 17 by pipe 22, is in a closed position to isolate the loading hopper 16 from the pressure lock 17. Thus, the loading hopper 16 is in communication only with the supply hopper 13 through the closure 14 and consequently atmospheric pressure will prevail therein during this loading operation.

The pressure compensating valve 19 is connected by a pipe 29 to a second pressure compensating valve 23 controlled by a hydraulic jack 24 and connected to pressure lock 17 by pipes 22, 29 and to a coal feed pipe 25 by a pipe 30. During the filling of loading hopper 16 and while such hopper is isolated of the pressure compensating valve 19, the pressure compensating valve 23 is opened, as shown, to bring the interior of the pressure lock 17 into communication with the interior of the feed pipe 25. The feed pipe 25 is in communication at its lower entry end with the discharge end 33 of supply pipe 6 through which water under pressure is being forced down into the mine by the pump 5. Accordingly this water under high pressure flows up into pipe 25 and will tend to pass up into pressure lock 17 whenever the bottom valve thereof is opened. So also when valve 23 establishes communication between the feed pipe 25 and the lock 17, water will also flow up through the pipes 22, 29 and 30 and into the upper end of the lock 17. Thus, as the coal is discharging from the pressure lock 17, the water which is fed up through the pipes 22, 29 and 30 under the high pressure prevailing in the feed pipe 25, and into the upper end of the pressure lock 17, will oppose the water tending to flow directly into such lock from pipe 25 through the bottom valve 27.

When the charging of the loading hopper 16 is completed, the discharge opening of the supply hopper 13 controlled by the closure 14 is closed, bottom valve 27 of the pressure lock 17 is closed by an associated hydraulic jack 28, the pressure compensating valve 19 is opened, and the pressure compensating valve 23 is closed. As a result of these operations, the lock chamber 17 is shut off from the feed pipe 25 where high pressure prevails, and is brought into communication with the loading hopper 16 to be subjected to the atmospheric pressure of the latter. The bottom valve 18 of the loading hopper 16 is then opened by a hydraulic jack 26 to allow the coal to pass therefrom into the pressure lock 17. When the pressure lock 17 is full, the valve 18 and the pressure compensating valve 19 are closed to completely isolate such lock from the loading hopper 16. The pressure compensating valve 23 is then opened to bring the pressure lock 17 into communication with the feed pipe 25. This results in an abrupt change of the pressure in the pressure lock 17 from atmospheric to the high pressure present in the feed pipe 25. As a consequence, there is produced the double effect of an expansion of the lock chamber and a compression of the water in such chamber. This effect tends to produce a momentary swift flow of water from the pipe 25 through the pipes 29 and 30, followed by an abrupt cessation of such flow, which action creates a serious water hammer in the pipes 29 and 30. In accordance with the invention, this water hammer is prevented by providing in the pipe 30 adjacently to the feed pipe 25 units having such a high load loss that the flow of water through pipe 30 from the feed pipe 25 is braked, such as for example, the cyclone 31 and the diaphragm 32. The braking of the fluid flow through pipe 30 increases the time-span required for increasing the pressure in the chamber of the pressure lock 17 to the extent necessary to overcome the possibility of water hammer.

When the pressure lock 17 has assumed the pressure of the water in the feed pipe 25, its associated hydraulic jack 28 opens the bottom valve 27 thereof to permit the coal to enter pipe 25. As has previously been indicated, the hydraulic jack 15 will at the same time open closure 14 to permit the feed of coal from the supply bin 13 to the loading hopper 16.

The intake water for the two pressure lock systems I and II is supplied through the bottom end portion 33 of the supply pipe 6 and passes therefrom into the system part 9 where it enters both the bottom ends of the feed pipes 25, 25' of the two lock systems I and II, respectively, and the lower end portion 34 of the surfacing pipe 2. Prior to its entry into the pipe portion 34 the intake water is thoroughly mixed with the coal passing through the feed pipe 25 from the pressure lock 17 so that a coal and water mixture passes up into such pipe portion 34. The flow of water through pipe portion 33 into the mixing chamber of system part 9 is shown in FIG. 3 by the arrow *f*1, and the entry of the coal-water mixture into pipe portion 34 is shown by the arrow *f*2 in such figure.

It will be understood that the pressure lock system II is identical in construction and operation to the above described pressure lock system I, but that its operating cycle is suitably out-of-phase with respect to the cycle of system I to assure that there is fed to the entry end of pipe portion 34 from the feed pipes 25, 25' of such systems a substantially continuous supply of coal. This coordinated operation of the two systems is accomplished by means of a hydraulic distributor 36 of known construction which is connected by the hydraulic circuit generally designated 35 to the hydraulic jacks for operating the closures; valves and pressure compensating valves. A motor compressor unit 37 supplies the entire hydraulic control circuit 35.

In order that a better understanding may be obtained of the coordinated operation of the parts in the two systems I and II, reference is made to FIGS. 4a, 4b, 4c and 4d of the drawings. It will be noted that in the schematic showing of FIG. 4a, the parts are depicted as illustrated in FIG. 3 which shows the relation of the parts in the two systems in the initial time-span of a cycle of operation of the entire double pressure lock system. In such initial time-span as previously explained, the loading hopper 16 is being filled, the pressure lock 17 is discharging its load of coal into its associated feed pipe 25 which directs the same to the mixing chamber 9, hopper 16 is isolated from the pressure lock 17 and the latter is pressure connected to such feed pipe 25 by the line generally designated 12 and representing in FIG. 4a the pipes 22, 29 and 30, pressure compensating valve 23 and high load loss units 31 and 32 of FIG. 3. At the same time, in the system II, the loading hopper 16' is discharging its load of coal into the pressure lock 17', and the pressure lock 17' is cut off from its associated feed pipe 25', but is pressure connected to the hopper 16' by the line generally designated 11' and representing in FIG. 4a the pressure compensating means of the system II corresponding to the pipes 21, 22 and the pressure compensating valve 19 of FIG. 3.

Figures 4A, 4B:
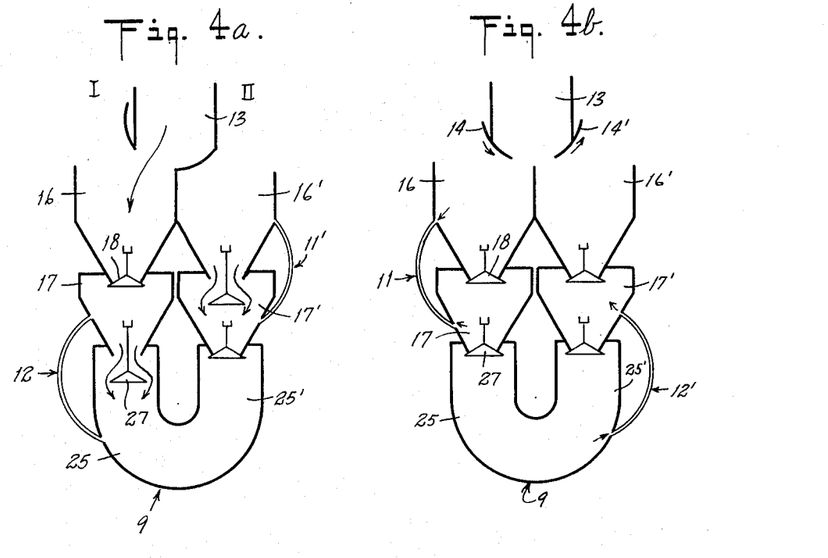
FIGS. 4a, 4b, 4c and 4d illustrate diagrammatically the several steps in the operations of the double pressure locks of the arrangement shown in FIG. 3.

As is shown in FIG. 4b, during the next time interval of the cycle, which is of very brief duration, there occurs a compensation of pressures between the loading hopper 16 and the pressure lock 17 through the line generally designated 11 in FIG. 4b and representing the pipes 21, 22 and the pressure compensating valve 19 of FIG. 3. At the same time there also occurs a compensation of pressures between the pressure lock 17' and its associated feed pipe 25' through the line generally designated 12' in FIG. 4b and representing the pressure compensating means of system II corresponding to those represented by the line 12 of system I in FIG. 4a. In this interval, the pressure lock 17 is cut off from its associated feed pipe 25, and the pressure lock 17' is pressure isolated from its associated loading hopper 16', the hopper closure 14 is starting to close and the hopper closure 14' is starting to open.

Figure 4C:
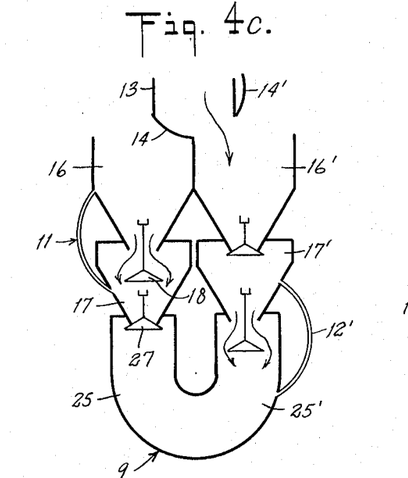

FIG. 4c illustrates the operations occurring in the third period of the cycle. It will be noted that in this third period, the loading hopper 16 is discharging into the pressure lock 17 which remains pressure connected to the former through line 11 and cut off from its associated feed pipe 25, while in system II, the loading hopper 16' is being filled and the pressure lock 17' discharges its load into its associated feed pipe 25' with which it remains pressure connected through the line 12'. In this period the hopper closure 14 is fully shut and the hopper closure 14' fully open.

Figure 4D:
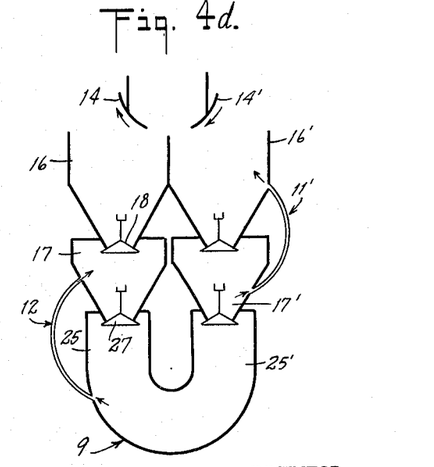

In the last period of the cycle which is of very short duration, and with the pressure lock 17 and loading hopper 16' filled with their respective changes of coal, the pressure compensating means is operated, as indicated in FIG. 4d, to cause pressure equalization to take place between pressure lock 17 and its associated feed line 25, and between the pressure lock 17' and its associated loading hopper 16'. In this period the hopper closure 14 is starting to open and the hopper closure 14' is starting to close. At the end of this last period the parts will be in such relation that they are ready to be actuated to the relation shown in FIG. 4a at the start of the next cycle.

It is in the carrying out of the last period of the cycle that the injurious phenomenon of water hammering will occur if it is not prevented in accordance with the invention. It has been found that water hammer will occur if there is allowed to be too free a communication between either of the pressure locks 17, 17' when the pressure therein is atmospheric and its associated feed pipes 25, 25', respectively, wherein the pressure is of the order of some dozens of kilograms per square centimeter. This free communication is avoided in accordance with the invention, by braking the compensating flow through the pipes 22, 29, 30 and 38 in FIGS. 3 and 8 associated with a pressure lock, when the latter's associated pressure compensating valve 23 is opened to establish pressure contact between the pressure lock and its associated feed pipe. Such braking action is accomplished by providing between the pipes 30 and 38 a cyclone 31 and a diaphragm 32 which are shown on an enlarged scale in FIG. 8 of the drawings.

Figure 5:
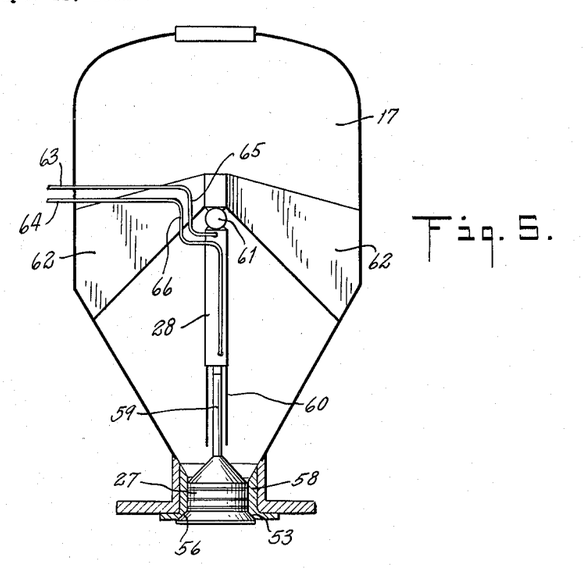
FIG. 5 is an enlarged detailed view, in vertical section, of one of the pressure locks to illustrate the construction of the control jack for the discharge valve thereof.

It will be noted from FIG. 3 that the hydraulic jacks for controlling the valves associated with the loading hoppers 16, 16' and the pressure locks 17, 17' are mounted inside of such system parts. As is shown more clearly in FIG. 5 of the drawings, in which is depicted the pressure lock 17 for the purposes of illustration, the jack 28 controlling the pressure lock valve 27 is supported by a ball and socket joint 61 carried by bracket arms 62 provided within the interior of the pressure lock 17 so that such jack is suspended from an axis of universal movement thereof located along the longitudinal axis of such lock when also forms the centerline for the entry and discharge ports of such lock. This jack suspension with the aid of a ball and socket joint makes it possible for the jack to swivel in all directions and assures a perfect alignment of the base 53 of valve 27 on its seat 56. The control rod 59 of the valve which is carried by the jack 28, is safeguarded against abrasion by the coal passing through the pressure lock 17, by means of a jacket 60 depending from the lower end of the jack.

Operating liquid for the jack 28 is provided by two pipes 63, 64 which form part of the hydraulic circuit 35 (note FIG. 3) and which extend in sealed relation through the wall of the pressure lock 17 and are secured to the bracket arms 62. In order to make it possible for the jack to swivel about its ball-and-socket joint 61, the pipes 63, 64 are provided with flexible sections 65, 66, respectively, between the jack and the bracket arms 62.

The above described construction is employed in the construction and arrangement of each jack associated with one of the valves controlling the flow of coal through the loading hoppers 16, 16' and the presure locks 17, 17'. It will be noted that each of the valves associated with such jacks is of considerable weight, of the order of 300 kg., for example, for an average sized piece of equipment. This gives the valve sufficient inertia to prevent its swinging when in open position as the coal is traversing it. Accordingly, this great weight of each valve renders it quite stable in open position even though it is suspended from a ball-and-socket joint.

Figure 6:
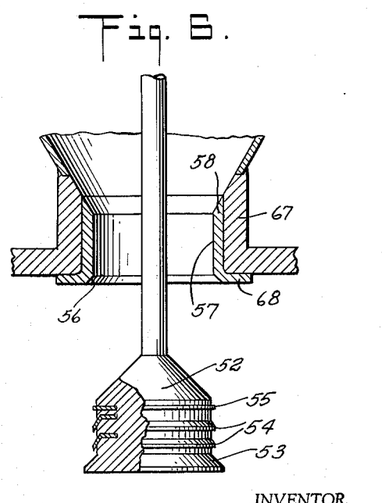
FIG. 6 is an enlarged partial view showing in vertical section the discharge valve in open position.
Figure 7:
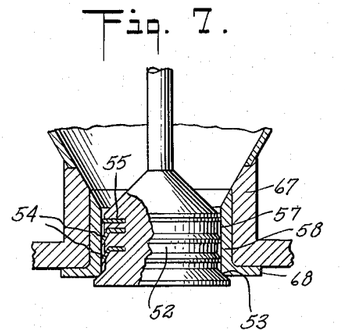
FIG. 7 is a view similar to FIG. 6 showing the discharge valve in closed position.

Further, in accordance with the invention, each of the valves associated with the loading hoppers 16, 16' and the pressure locks 17, 17', as is shown more clearly in FIGS. 6 and 7 of the drawings, is composed of a cylindrical body 52 from the lower end of which projects the flange-like valve base 53, and the upper end of which is conically-shaped with its conical surface forming an angle of approximately 45° with the horizontal. The body 52 is provided with two gaskets 54, 54 made of suitable material and contained in annular grooves formed in the body to cause the outer projecting edge portions of such gaskets to be inclined downwardly from the horizontal at an angle of about 30°. Located above the gaskets 54, 54 is a third gasket 55 having its outer projecting edge disposed at right angles to the outer surface of the body.

The seat associated with each valve is composed of an annular sleeve 58 fitted within its associated tubularly-shaped port 67, the upper ends of such sleeve 58 and port 67 being inclined and flush so that the coal material can pass over such ends into the bore 57 of the sleeve without catching thereon. The bottom end of the sleeve 58 is provided with an external flange at the bend of which is formed an internal annular surface 56 with which the base 53 engages. It will be noted that the abutting annular surface of the base 53 and the internal surface 56 are shaped in the form of a cone at an angle of approximately 45° with the horizontal.

It will be understood from the foregoing, that when the valve is open, as is shown in FIG. 6, the coal material will pass freely through the seat without catching and will impinge against the conically-shaped upper end of the valve body 52 and the conically shaped base 53 and on which such material cannot lodge. The upper end of the valve body will deflect the discharging coal away from the gaskets 54 and 55 thereby reducing to a minimum the possibility of such gaskets being subjected to the abrading action of the coal material.

When the valve is closed, the gasket 55 will first engage the bore 57 of the sleeve 58 and function in the nature of a scraper to clean out the bore of any particles which may have deposited thereon prior to the entry of the gaskets 54, 54 into such bore. As the valve enters the sleeve 58 the base 56 will cooperate with the cone-shaped surface 53 which functions in the nature of a cam surface to center the valve perfectly. The actual seal of the fully seated and correctly centered valve is provided by the adhesion of the gaskets 54 with the bore 57 of the seat 58, under the pressure which is brought to bear against the bottom face of the valve base 53 by the liquid in the chamber below the closed port.

In addition to the pressure compensating devices above described, each of the pressure lock systems I and II is preferably equipped with hydraulic means for accelerating the flow of the coal material therethrough during the first and third intervals of each cycle of the overall system. As the means for accomplishing this result are the same for both systems, there has been shown in FIG. 8 for the sake of clearness only the means associated with the lock system I, it being understood that both systems I and II will embody a duplicate construction.

Figure 8:
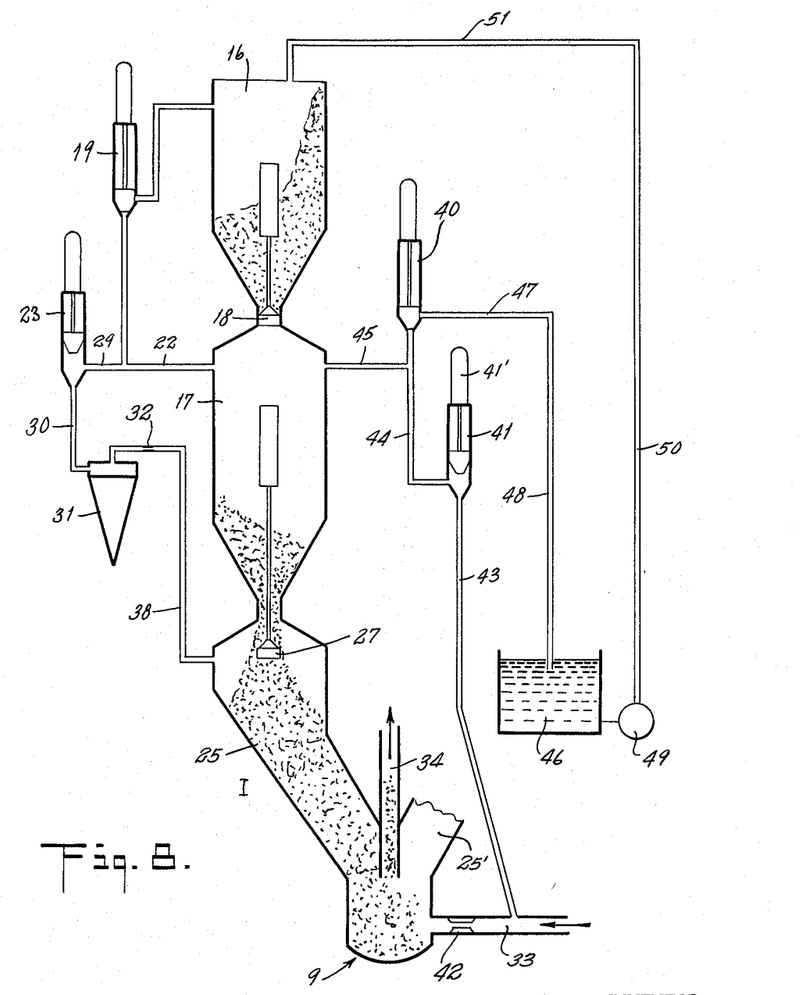
FIG. 8 is a schematic elevational view of a single pressure lock charging system provided with a pressure compensating device for the pressure lock, and a flow accelerating arrangement for such system, pursuant to the invention.

As is shown in FIG. 8, the means associated with each system comprises a hydraulic circuit composed of two valves 40 and 41 provided with large valve members, a recovery tank 46, a circulating pump 49 and pipes 43, 44, 45, 47, 48, 50 and 51.

In considering the operating cycle of this apparatus reference should be made to the four intervals in the cycle of operation of the plant depicted in FIGS. 4a, 4b, 4c and 4d. FIG. 8 shows the relation of the parts of the accelerating apparatus in the first time interval of the cycle as depicted in FIG. 4a. As is shown in both FIGS. 4a and 8, in this first interval valve 18 is closed and valve 27 is open. In the accelerating apparatus valve 40 will be closed and valve 41 open so that the pipe 33 which constitutes the bottom end section of supply pipe 6, is in communication with the upper end of the pressure lock 17 through pipes 43, 44 and 45. The diaphragm 42 lodged in supply pipe 33 at the intake of the feed pipes 25, 25', produces an adequate excess pressure such as will cause the supply water to rise in pipes 43, 44 and 45 and discharge into the pressure lock 17 and thus replace the coal which is being discharged into pipe 25. This supply of water will also eliminate all water circulation in the direction opposite to that in which the coal is moving through the port controlled by the valve 27. By so maintaining the pressure lock 17 filled with water under a pressure higher than that prevailing in the feed pipe 25 as the coal is discharging and consequently eliminating the water circulation which would otherwise tend to brake the flow of the coal into the feed pipe 25, the unloading operation of the pressure lock 17 is substantially accelerated.

In the second relatively short time interval of the cycle in which valves 18 and 27 are both closed, as indicated in FIG. 4b, valve 41 closes to cut off the pressure lock 17 from the supply pipe 33. As in this interval the pressure compensating valve 19 is opened to bring the pressure lock 17 into pressure communication with the loading hopper 16 (note FIG. 4b), the pressure in the chamber of lock 17 will be reduced to atmospheric. The valve member of valve 40 is of sufficiently large dimensions so that in its closed position, it simultaneously closes both pipes 45 and 47, and therefore such valve member will be equally balanced between the atmospheric pressures applied to its two faces from the lock 17 and the tank 46. Under such conditions the valve 40 is capable of being opened by a slight amount of force applied by its associated jack 40'.

When valve 18 opens and valve 27 remains closed in the third interval of the cycle to accomplish the discharge of the coal from the loading hopper 16 into the pressure lock 17, as illustrated in FIG. 4c, valve 40 will be opened and valve 41 will remain closed to continue the isolation of lock 17 from the supply line 33. When valve 40 opens, water is tapped from the chamber of lock 17 and flows by gravity through the pipes 45, 47 and 48 to the recovery tank 46. The water so recovered in the tank 46 is forced by the pump 49 up through the pipes 50 and 51 and into the emptying loading hopper 16 to take the place of the coal being removed therefrom. It will be evident that as a result of such manipulation of the water in lock 17 and hopper 16, the discharge of the coal from hopper 16 into the chamber of lock 17 will be greatly accelerated.

In the last short interval of the cycle wherein both valves 18 and 27 are again closed and the chamber of pressure lock 17 is in pressure communication with pipe 25 (note FIG. 4d), valve 41 will remain closed, and valve 40 will close to cut off lock 17 from the recovery tank 46 and ready the condition of pipes 43, 44 and 45 to again bring the lock 17 into communication with the feed pipe 33 as soon as valve 41 is opened. It will be noted that since lock 17 is now in pressure communication with the pipe 25, the valve member of valve 41 which is of sufficiently large dimensions to simultaneously close the associated openings in both pipes 43 and 44 in its closed position, will be balanced by the substantially equal pressures applied to its two faces originating from the pipes 25 and 33. Consequently, valve 41 will be able to open by a slight amount of force applied by its associated jack 41' at the commencement of the next cycle of the system.

While there has hereinabove been described and illustrated in the drawings, a preferred embodiment of the invention, it will be apparent to those skilled in the art that changes and modifications may be made therein without departing from the spirit of the invention or the scope of the appended claims.

What is claimed is:

1. In apparatus for hydraulically conveying mineral material and having a conveying pipe through which a mixture of such material and water is conveyed, and means for introducing a supply of the mineral material into said pipe, including a container for the material having at its upper end an entry opening through which the material is loaded into said container and having at its lower end a discharge port through which the material is advanced to said conveying pipe, the combination of a hydraulic jack encased in said container, means for supporting said jack in depending relation above said discharge port including internal bracket means secured to said container and a universal joint connecting the upper end of said jack to said bracket means so as to enable said jack to move in all directions with relation to said bracket means, a valve control rod extending downwardly from said jack toward said discharge port, and a valve mounted on the lower end of said control rod and carried by said jack for controlling the passage of material through said discharge port and movable downwardly away from said container in its opening movements, said movable jack enabling said valve to correctly center on said discharge port in said valve's upward closing movements, and the upper portion of said valve being configured to cooperate with said discharge part to effect the centering of said valve in its closing movements.

2. In apparatus for conveying material and having a container for the material provided with an entry opening through which the material is loaded into said container and provided at its lower end with a cylindrically-shaped discharge port through which the material is passed from said container, and pendulous valve means controlling the passage of the material through said discharge port, and including a valve member having a cylindrical body portion of a diameter less than the diameter of the port opening and receivable into the latter, and having a plurality of gaskets mounted in vertically spaced relation on said cylindrical body portion and with their peripheral outer edges projecting from the cylindrical wall of said body portion, means within said container for supporting said valve member in pendulous fashion below said port opening to permit the discharge of material from said container, and means within said container for raising said pendulous valve member into seated condition in said discharge port to close the same, the upper portion of said valve member above said gaskets being configured to cooperate with said discharge port to center said pendulous valve member as it enters into said discharge port to close the same and prior to the entry of said gaskets into such discharge port.

3. Apparatus such as defined in claim 2, in which said valve member is relatively heavy and of such weight as to give it sufficient inertia to prevent it swinging in its lower pendulous position as the material is discharged through said port.

4. Apparatus according to claim 2, in which said valve member supporting means comprises a hydraulic jack having its piston rod connected to and functioning as a valve stem for said valve member and extendable through said discharge port to lower said valve member to open position, and means for supporting said jack in depending relation above said discharge port including internal bracket means secured to said container and a universal joint connecting the upper end of said jack to said bracket means so as to enable the former to move in all directions, and to enable said upper portion of said valve member to coact with said discharge port to correctly center said gasket carrying body portion of said valve member in said discharge port in the upward closing movements thereof.

5. Apparatus as defined in claim 2, in which the upper portion of said valve member is cone-shaped and of a configuration to enable such upper end portion to engage with the cylindrical bore of said discharge port to effect such centering of the valve member at the beginning of the latter's closing movement in said discharge port, and to deflect material discharging from said port outwardly and away from the seating surfaces of said valve member below such upper portion thereof.

6. Apparatus as defined in claim 5, in which said discharge port has a conically-shaped cam surface at the lower end thereof cooperable with said cone-shaped upper portion of said valve member to facilitate the centering of the cylindrical body portion of said valve member in the cylindrical bore of said discharge port.

7. In apparatus for conveying material and having a container for the material provided with an entry opening through which the material is loaded into said container and provided at its lower end with a cylindrically-shaped discharge port through which the material is passed from said container, and pendulous valve means controlling the passage of the material through said discharge port, and including a valve member having a cylindrical body portion of a diameter less than the diameter of the port opening and receivable into the latter, an annular sleeve liner forming the cylindrical opening of the discharge port and having an outwardly extending bottom flange at the lower end thereof forming the lower end of the discharge port, the inner surface portion of said liner defining the inner wall of said flange being beveled outwardly from the opening in said discharge port and forming a cam surface to center said body portion in such opening, said cylindrical body portion being provided with a projecting annular portion at the bottom end thereof cooperating with said cam surface as the valve member is moved to closed position to center said body portion in such port opening, and said valve member having a plurality of gaskets mounted in vertically spaced relation on said cylindrical body portion and with their peripheral outer edges projecting from the cylindrical wall of said body portion, means within said container for supporting said valve member in pendulous fashion below said port opening to permit the discharge of material from said container, and means within said container for raising said pendulous valve member into seated condition in said discharge port to close the same.

8. In apparatus for conveying material and having a container for the material provided with an entry opening through which the material is loaded into said container and provided at its lower end with a cylindrically-shaped discharge port through which the material is passed from said container, and pendulous valve means controlling the passage of the material through said discharge port, and including a valve member having a cylindrical body portion of a diameter less than the diameter of the port opening and receivable into the latter, and having a plurality of gaskets mounted in vertically spaced relation on said cylindrical body portion and with their peripheral outer edges projecting from the cylindrical wall of said body portion, means within said container for supporting said valve member in pendulous fashion below said port opening to permit the discharge of material from said container, and means within said container for raising said pendulous valve member into seated condition in said discharge port to close the same, the upper one of said gaskets being formed to scrape the interior wall of said cylindrically-shaped discharge port as said valve member is moved upwardly to closed position to remove any material which may have lodged on such interior wall and thereby to clean the latter in advance of a following gasket, and a lower one of said gaskets being formed to provide a seal between such interior wall and the spaced opposed wall of said body portion of the valve member.

9. Apparatus such as defined in claim 8, in which there are three of said gaskets mounted in vertically spaced relation on said cylindrical body portion, the projecting outer edge of said upper scraper gasket being disposed at right angles to the cylindrical wall of said body portion, and the projecting outer edges of the two lower gaskets extending downwardly in inclined relation to such cylindrical wall.

References Cited by the Examiner

UNITED STATES PATENTS

| | | | |
|---|---|---|---|
| 831,635 | 9/1906 | Strunce | 302—15 |
| 1,618,395 | 2/1927 | Ward | 302—15 |
| 1,842,234 | 1/1932 | Barr | 214—36 |
| 2,026,732 | 1/1936 | Farley | 302—36 |
| 2,563,681 | 8/1951 | Johnson | 214—36 |
| 2,710,121 | 6/1955 | Rees | 137—244 |
| 2,793,082 | 5/1957 | Gardner | 302—14 |
| 2,937,049 | 5/1960 | Osawa | 302—14 |
| 2,938,751 | 5/1960 | Nogami | 302—36 |
| 3,943,890 | 7/1960 | Hrabouszky | 302—14 |

FOREIGN PATENTS

| | | |
|---|---|---|
| 1,210,036 | 9/1959 | France. |

SAMUEL F. COLEMAN, *Primary Examiner.*

ANDRES H. NIELSEN, *Examiner.*